(12) United States Patent
Gao et al.

(10) Patent No.: US 11,597,177 B2
(45) Date of Patent: Mar. 7, 2023

(54) DECORATIVE FILM

(71) Applicant: Shine Optoelectronics (Kunshan) Co., Ltd., Kunshan (CN)

(72) Inventors: Yulong Gao, Kunshan (CN); Guisheng Wang, Kunshan (CN); Guangzhou Yang, Kunshan (CN); Tinggang Li, Kunshan (CN)

(73) Assignee: Shine Optoelectronics (Kunshan) Co., Ltd., Kunshan (CN)

( * ) Notice: Subject to any disclaimer, the term of this patent is extended or adjusted under 35 U.S.C. 154(b) by 58 days.

(21) Appl. No.: 16/493,210

(22) PCT Filed: Mar. 7, 2018

(86) PCT No.: PCT/CN2018/078269
§ 371 (c)(1),
(2) Date: Sep. 11, 2019

(87) PCT Pub. No.: WO2018/166385
PCT Pub. Date: Sep. 20, 2018

(65) Prior Publication Data
US 2020/0384723 A1    Dec. 10, 2020

(30) Foreign Application Priority Data

Mar. 11, 2017  (CN) .......................... 201710143433.6

(51) Int. Cl.
*B32B 3/30* (2006.01)
*B32B 7/12* (2006.01)
(Continued)

(52) U.S. Cl.
CPC .................. *B32B 3/30* (2013.01); *B32B 7/12* (2013.01); *B32B 17/06* (2013.01); *B32B 27/06* (2013.01);
(Continued)

(58) Field of Classification Search
CPC .. B32B 3/30; B32B 7/12; B32B 17/06; B32B 27/06; B32B 2255/10; B32B 2255/20;
(Continued)

(56) References Cited

U.S. PATENT DOCUMENTS

| 5,450,235 A | * | 9/1995 | Smith | B29C 39/148 |
| | | | | 359/529 |
| 6,150,007 A | * | 11/2000 | Oshima | B32B 27/08 |
| | | | | 428/161 |
| 8,199,406 B2 | * | 6/2012 | Takenaka | G02B 5/124 |
| | | | | 359/634 |

FOREIGN PATENT DOCUMENTS

| CN | 104291016 A | 1/2015 |
| CN | 205365001 U | 7/2016 |
| CN | 205902241 U | 1/2017 |

OTHER PUBLICATIONS

Translation of CN205902241. (Year: 2017).*
(Continued)

*Primary Examiner* — Catherine A. Simone
(74) *Attorney, Agent, or Firm* — Hamilton, Brook, Smith & Reynolds, P.C.

(57) ABSTRACT

The present invention discloses a decorative film comprising a colored polymer film layer and a micro/nano-structure layer on a surface of the colored polymer film layer, wherein the micro/nano-structure layer comprises a plurality of colored polymer micro/nano-structures. Due to the colored polymer film layer and the plurality of colored polymer micro/nano-structures, a color with an optical effect can be displayed, the color modulation is reduced and the process is simplified.

5 Claims, 3 Drawing Sheets

(51) Int. Cl.
*B32B 17/06* (2006.01)
*B32B 27/06* (2006.01)

(52) U.S. Cl.
CPC ....... *B32B 2255/10* (2013.01); *B32B 2255/20* (2013.01); *B32B 2255/205* (2013.01); *B32B 2307/402* (2013.01); *B32B 2307/412* (2013.01); *B32B 2307/416* (2013.01); *B32B 2551/00* (2013.01)

(58) Field of Classification Search
CPC ........ B32B 2255/205; B32B 2307/402; B32B 2307/4026; B32B 2307/404; B32B 2307/4023; B32B 2551/00; G02B 3/005; G02B 3/0037; G02B 3/08; G02B 3/0056; Y10T 428/24479; Y10T 428/24901; Y10T 428/24876; G02F 1/133526
USPC .......................................... 428/156; 359/619
See application file for complete search history.

(56) References Cited

OTHER PUBLICATIONS

Indian Search Report for Indian Application No. 201917040031, dated Jun. 25, 2020.
Supplementary Search Report for Chinese Application No. 201710143433.6, dated Apr. 8, 2019.

\* cited by examiner

DECORATIVE FILM

This application is the U.S. National Stage of International Application No. PCT/CN2018/078269, filed on Mar. 7, 2018, which designates the U.S., published in Chinese, and claims priority under 35 U.S.C. § 119 or 365(c) to Chinese Application No. 201710143433.6, filed on Mar. 11, 2017. The entire teachings of the above applications are incorporated herein by reference.

TECHNICAL FIELD

The present invention relates to optical films, and in particular to a decorative film.

BACKGROUND

Decorative films are often used in the decoration of the surface of various articles to embellish the surface of the decorated objects. Especially in the electronic product and home appliance industries, attempts are made for technological innovation and functional innovation to meet the development trend of environmental protection, energy conservation and differentiation. Many designers have turned their attention to the design of appearance.

For example, a decorative film has been proposed that includes a coloring layer, a reflective layer, and a cylindrical lens layer stacked in this order. The decorative film achieves an ideal color by modulating color of the coloring layer and the reflective layer, and realizes an optical effect such as a light column by the cylindrical lens layer, so that the color of the decorative film is not monotonous and the effect is vivid, which is in line with the current popular trend. However, the color of the decorative film is formed by modulating color of the coloring layer and the reflective layer, which involves a complicated process.

In view of this, the present invention aims to solve the existing technical problems by improving the decorative film.

SUMMARY OF THE INVENTION

In view of above, it is necessary to provide a decorative film to solve the above technical problems.

In one aspect, the present invention provides a decorative film comprising a colored polymer film layer and a micro/nano-structure layer on one surface of the colored polymer film layer, wherein the micro/nano-structure layer comprises a plurality of colored polymer micro/nano-structures.

In one example thereof, the plurality of colored polymer micro/nano-structures are a plurality of convex and/or concave structures.

In one example thereof, the colored polymer micro/nano-structure and the colored polymer film layer are integrally provided, or the plurality of colored polymer micro/nano-structures are formed on the colored polymer film layer and have a color that is the same as or different from that of the colored polymer film layer.

In one example thereof, a substrate layer is provided on another surface of the colored polymer film layer opposite to the micro/nano-structure layer.

In one example thereof, the substrate layer is a transparent layer.

In one example thereof, the micro/nano-structure layer is covered with a reflective layer.

In one example thereof, the reflective layer is a metal layer, a metal oxide layer or a non-metal oxide layer coated on the micro/nano-structure layer, or the reflective layer is plated on the micro/nano-structure layer.

In one example thereof, the reflective layer is covered with a coloring layer.

In one example thereof, the coloring layer is a colored adhesive layer or a colored ink layer.

In one example thereof, a reflective layer is provided between the substrate layer and the colored polymer film layer.

In one example thereof, a coloring layer is provided between the reflective layer and the substrate layer.

In one example thereof, the colored polymer micro/nano-structure is a microlens, a cylindrical lens, a Fresnel lens, a CD (compact disc) pattern, a moth-eye structure, or a brushed pattern.

In one example, the colored polymer micro/nano-structure has a cross section in the form of a triangular, semicircular, rectangular, trapezoidal, concave or irregular shape, and the colored polymer micro/nano-structures are provided continuously or discontinuously.

The present invention has beneficial effects that the colored polymer film layer and the plurality of colored polymer micro/nano-structures provided by the present invention show color having an optical effect, which reduces the color modulation and simplifies the process.

DETAILED DESCRIPTION OF THE INVENTION

Figure 1:
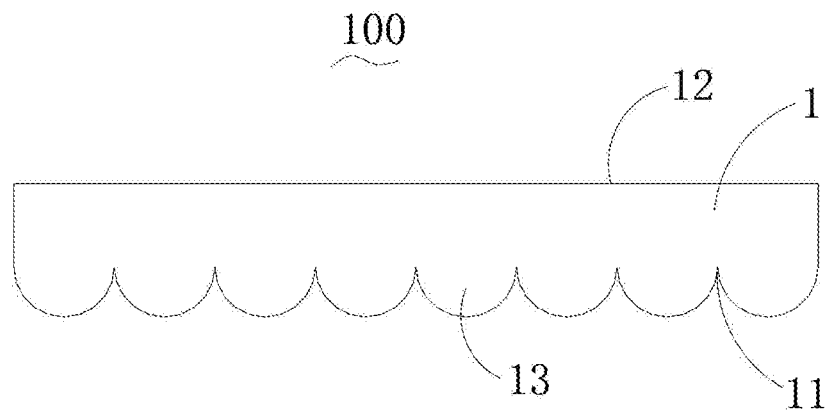
FIG. 1 is a schematic view showing a structure of a decorative film of the present invention.

The present invention will be described more fully below with reference to the drawings in order to facilitate the understanding of the present invention. Preferred embodiments of the present invention are given in the drawings. However, the present invention can be implemented in many different forms and is not limited to the embodiments described below. Rather, these embodiments are provided in order that the disclosure of the present invention will be more fully understood.

Unless defined otherwise, all technical and scientific terms used herein have the same meanings as commonly understood by one artisan in the technical field to which the present invention belongs. Herein, the terms are used in the Description of the present invention for the purpose of describing particular embodiments, but are not intended to limit the present invention. The term "and/or" as used herein includes any and all combinations of one or more of the listed items.

Referring to FIG. 1, the present invention discloses a decorative film 100 comprising a colored polymer film layer 1 and a micro/nano-structure layer on a surface 11 of the colored polymer film layer. The micro/nano-structure layer comprises a plurality of colored polymer micro/nano-structures 13. The plurality of colored polymer micro/nano-structures 13 include a plurality of convex structures and/or concave structures. Both the colored polymer film layer and the micro/nano-structure layer are formed from a colored polymer, preferably a colored UV adhesive, a colored OCA (optically clear adhesive) adhesive or the like. For example, for a colored UV adhesive, it only needs to select or modulate the color of the colored UV adhesive, and it is not necessary to adjust the combination of two colors as in the prior art, so that the color modulation is reduced, and thus the process is simple, and the color with an optical effect can be displayed, which has a good decorative effect.

Preferably, the plurality of colored polymer micro/nano-structures 13 and the colored polymer film layer 1 are integrally provided. For example, after the colored UV adhesive is applied, a plurality of convex micro/nano-structures are embossed, and when it is cured, the colored polymer film layer 1 and the plurality of colored polymer micro/nano-structures 13 are formed.

Preferably, the plurality of colored polymer micro/nano-structures 13 are formed on the colored polymer film layer 1 and have a color that is the same as or different with that of the colored polymer film layer 1. For example, a colored polymer film layer 1 is provided with a colored UV adhesive, and when it is cured, a plurality of convexes are formed on the colored polymer film layer 1 by means of printing or the like using a UV adhesive having the same or different color, to form a plurality of colored polymer micro/nano-structures 13. During this process, it is only necessary to modulate the color of the colored UV adhesive, without display modulation of the color of several layers, so the color modulation of the decorative film 100 is reduced.

Preferably, both the colored polymer film layer 1 and the colored polymer micro/nano-structure 13 are formed from a colored UV adhesive. In other embodiments, a colored polymer such as a colored OCA adhesive may be also used.

Referring to FIGS. 2 to 5, a substrate layer 2 is provided on the other surface 12 of the colored polymer film layer 1 opposite to the micro/nano-structure layer. The substrate layer 2 mainly serves as a support, and a flexible substrate, for example a flexible material such as PET, PC, or PMMA, or a hard substrate such as glass may be used.

Figure 2:
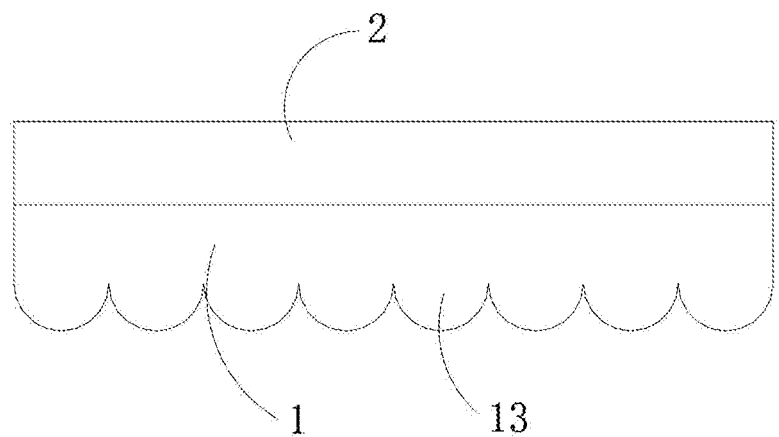
FIG. 2 is a schematic view showing another structure of a decorative film of the present invention.
Figure 3:
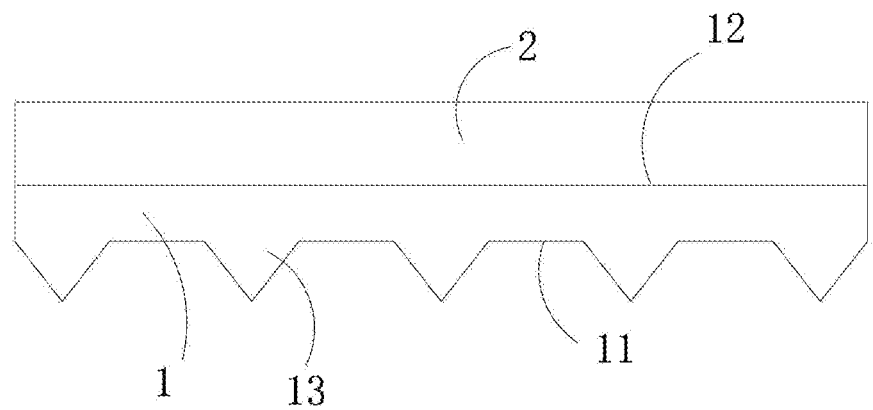
FIG. 3 is a schematic view showing a further structure of a decorative film of the present invention.
Figure 4:
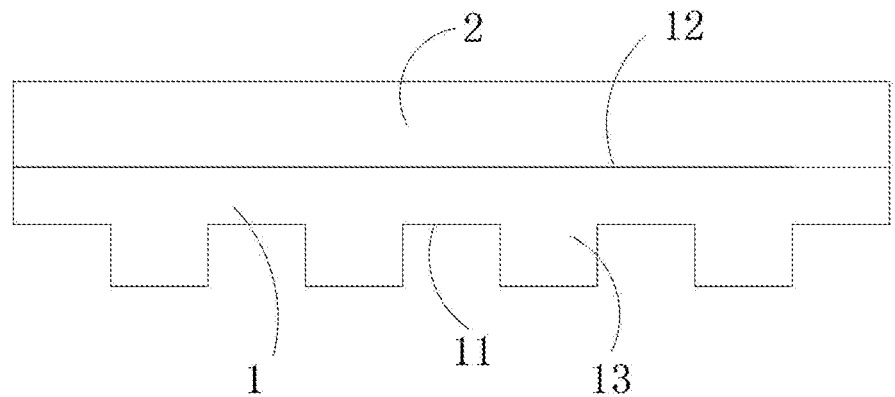
FIG. 4 is a schematic view showing a further structure of a decorative film of the present invention.
Figure 5:
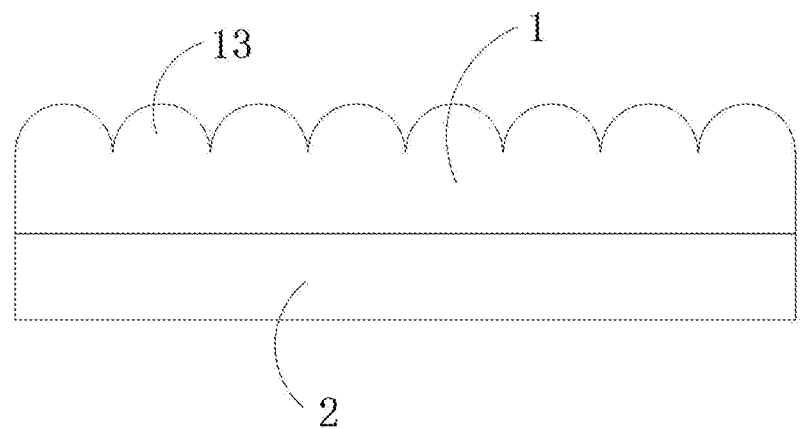
FIG. 5 is a schematic view showing a further structure of a decorative film of the present invention.

Preferably, referring to FIG. 2 to FIG. 4, the substrate layer 2 is a transparent layer, such as a glass material. The side with the colored polymer micro/nano-structure is attached to a surface of an article, such as a back cover of a mobile phone, and the substrate layer 2 is the cover glass of the mobile phone. Such a back cover of the mobile phone displays the color of the colored polymer film layer 1 and the colored polymer micro/nano-structure 13. Due to the colored polymer micro/nano-structure 13, it has different light and shadow effects as viewed from different angles, and the color is more gorgeous.

Figure 6:
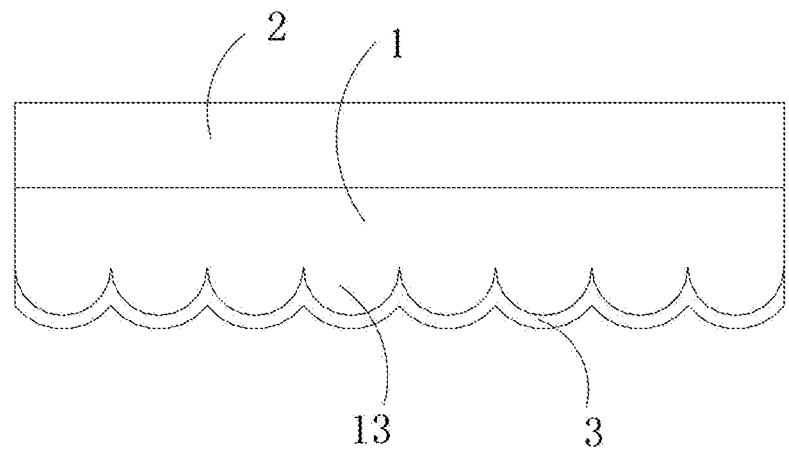
FIG. 6 is a schematic view showing a further structure of a decorative film of the present invention.

Further, referring to FIG. 6, the micro/nano-structure layer is covered with a reflective layer 3. The reflective layer 3 is a metal layer, a metal oxide layer or a non-metal oxide layer coated on the micro/nano-structure layer. Preferably, the reflective layer 3 is a brushed layer of silver paste to brighten the color and increase the decorative effect. Of course, the reflective layer 3 may also be plated on the micro/nano-structure layer. The reflective layer 3 can also have an effect of color modulation, to achieve a color modulation effect together with the colored polymer film layer, thereby making the color of the decorative film 100 more saturated and more textured.

Figure 7:
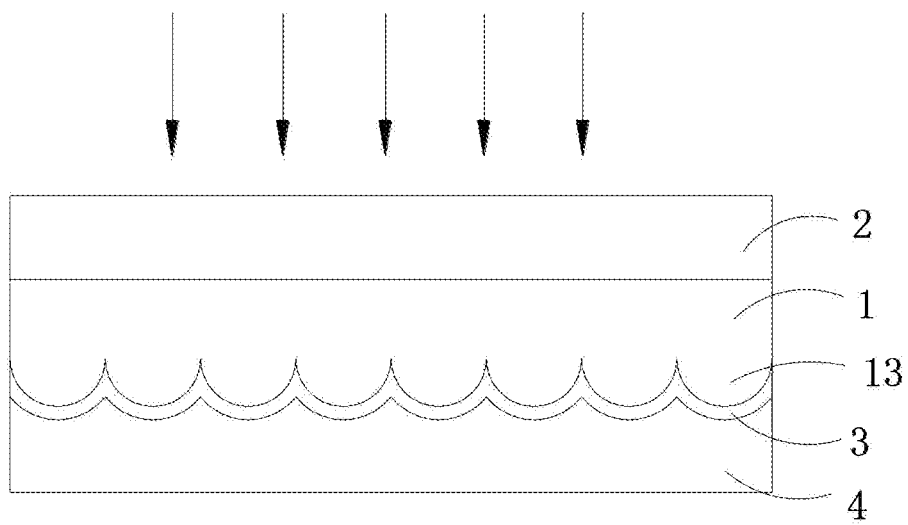
FIG. 7 is a schematic view showing a further structure of a decorative film of the present invention.

Further, referring to FIG. 7, the reflective layer 3 is covered with a coloring layer 4. Preferably, the coloring layer 4 is a colored adhesive layer or a colored ink layer. When the light enters in the direction indicated by the arrow in FIG. 7, the reflective layer 3 and the coloring layer 4 can display a certain color. However, due to the presence of the color of the colored polymer film layer, the color of the reflective layer 3 and the coloring layer 4 may not be exhibited, or it may be exhibited such that it does not significantly contribute to color display, which can reduce the color modulation, simplify the process, and make the color of the colored polymer film layer more rich and saturated, and allow the decorative film to have more textured and decorative effect.

Figure 8:
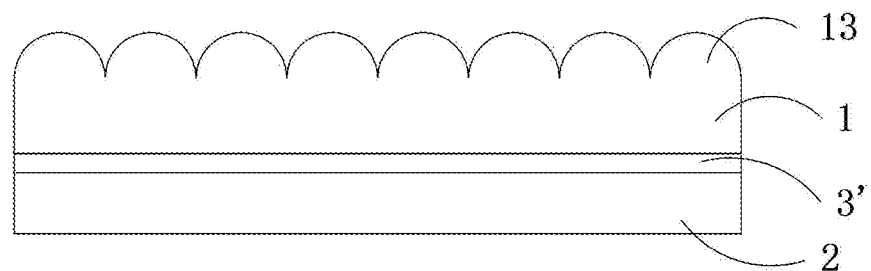
FIG. 8 is a schematic view showing a further structure of a decorative film of the present invention.
Figure 9:
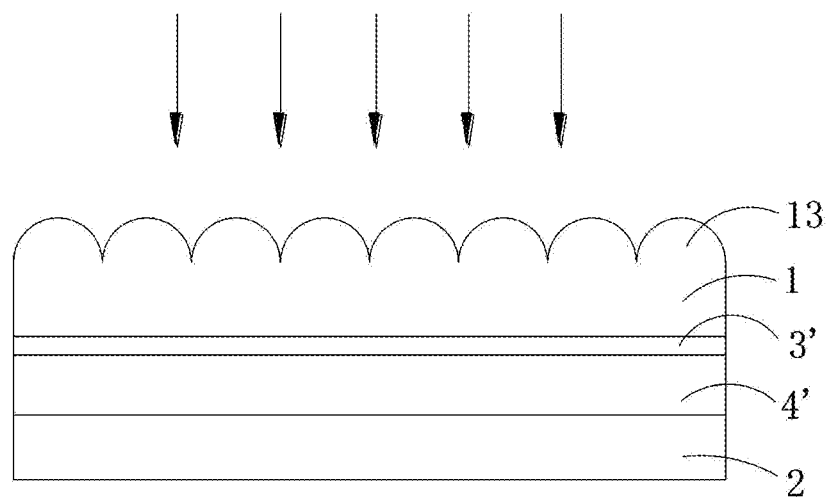
FIG. 9 is a schematic view showing a further structure of a decorative film of the present invention.

Referring to FIG. 8 and FIG. 9, in another embodiment of the decorative film, a reflective layer 3' is provided between the substrate layer 2 and the colored polymer film layer 1. A coloring layer 4' is provided between the reflective layer 3' and the substrate layer 2. In this embodiment, the substrate layer 2 may be transparent or opaque. The reflective layer 3' has a brightening effect on the color of the colored polymer film layer 1. The color modulation of the reflective layer 3' and/or the coloring layer 4' plays an auxiliary role in the color display of the colored polymer film layer 1. The light enters in the direction indicated by the arrow in FIG. 9, which shows the color of the colored polymer film layer 1 and the colored polymer micro/nano-structure 13. Due to the effect of the colored polymer micro/nano-structure 13, a dynamic change can be displayed with an excellent decorative effect. The reflective layer 3' and the coloring layer 4' will make the displayed color more saturated and beautiful. Also, the color modulation is reduced, and the process is simpler.

Referring to FIG. 2 to FIG. 4, the colored polymer micro/nano-structure of the decorative film of the present invention has many shapes, and may be a microlens, a cylindrical lens, a Fresnel lens, a CD pattern, a moth-eye structure or a brushed pattern. The colored polymer micro/nano-structure has a cross section in the form of triangular, semi-circular, rectangular, trapezoidal, concave or irregular shape, and the colored polymer micro/nano-structure is provided continuously or discontinuously.

The particular embodiments of the present invention have been described in detail with reference to the drawings, to enable the above objects, features and advantages of the present invention to be understood more clearly. Numerous specific details are set forth in the above description in order to provide a thorough understanding of the present invention. However, the present invention can be implemented in many other ways than those described above, and those skilled in the art can make similar modifications without departing from the spirit of the present invention, and thus the present invention is not limited by the specific examples disclosed above. Moreover, various technical features of the above-described examples may be arbitrarily combined. For the sake of conciseness of description, not all possible combinations of the technical features in the above examples are described. However, as long as the combination of these technical features has no contradiction, it should be considered to be within the scope of the description.

The above-mentioned examples are merely illustrative of several embodiments of the present invention, and the description thereof is specific and detailed, but should not be construed as limiting the patentable scope of the present invention. It should be noted that a number of variations and modifications may be made by those skilled in the art without departing from the concept of the present invention, and these variations and modifications belong to the protection scope of the present invention. Therefore, the protection scope of the patent for invention should be determined by the appended claims.

The invention claimed is:

1. A decorative film, comprising: a colored polymer film layer; and a micro/nano-structure layer disposed on one surface of the colored polymer film layer, wherein the micro/nano-structure layer comprises a plurality of colored polymer micro/nano-structures wherein the plurality of colored polymer micro/nano-structures are a plurality of convex and/or concave structures, wherein the colored polymer micro/nano-structure is a microlens, a cylindrical lens, a Fresnel lens, a CD pattern, a moth-eye structure, or a brushed pattern, wherein the colored polymer micro/nano-structure is formed from a colored polymer selected from a colored UV adhesive and a colored OCA adhesive, wherein a substrate layer is provided on another surface of the colored polymer film layer opposite to the micro/nano-structure layer, and wherein a reflective layer is provided between the substrate layer and the colored polymer film layer.

2. The decorative film according to claim 1, wherein the colored polymer micro/nano-structures and the colored polymer film layer are integrally provided, or the plurality of colored polymer micro/nano-structures are formed on the colored polymer film layer and have a color that is the same as or different from that of the colored polymer film layer.

3. The decorative film according to claim 1, wherein the substrate layer is a transparent layer.

4. The decorative film according to claim 1, wherein a coloring layer is provided between the reflective layer and the substrate layer.

5. The decorative film according to claim 1, wherein the colored micro/nano polymer structures have a cross section in the form of a triangular, semi-circular, rectangular, trapezoidal, concave, or irregular shape, and are arranged continuously or discontinuously.

* * * * *